United States Patent

[11] 3,631,781

| [72] | Inventors | Arnold Reginal Kennington;<br>Arthur Ernest Smith, both of 5 Bolton Road, London W.4, England |
|---|---|---|
| [21] | Appl. No. | 805,959 |
| [22] | Filed | Feb. 20, 1969 |
| [45] | Patented | Jan. 4, 1972 |
| [32] | Priority | Feb. 21, 1968 |
| [33] | | Great Britain |
| [31] | | 8,387/68 |

[54] AUTOMATIC PHOTOGRAPHING APPARATUS
8 Claims, 6 Drawing Figs.

[52] U.S. Cl. .................................................. 95/14,
95/18, 95/82, 355/54
[51] Int. Cl. ........................................................ G03b 17/50
[50] Field of Search............................................ 95/14, 65,
82, 31, 94, 18, 1.1; 352/122; 355/54, 46

[56] References Cited
UNITED STATES PATENTS
1,795,050   3/1931   Sinjian.......................... 95/18

2,192,755   3/1940   Rabkin et al................... 95/14
2,541,016   2/1951   Allen............................ 95/14

*Primary Examiner*—Samuel S. Matthews
*Assistant Examiner*—Richard L. Moses
*Attorney*—William R. Liberman ABSTRACT: An automatic photographic apparatus includes a booth having an operating compartment and a compartment in which a subject to be photographed can be positioned, and a viewing panel between the two compartments. A camera unit is arranged in the operating compartment and includes two cameras, the unit being slideable in a linear path to place either of the cameras in an operative position adjacent the viewing panel so that a photograph can be taken through the panel. A rotatable shaft extends from the unit. A linear track extends in a plane at right angles to the path of the unit with a guide roller arranged to run in the track, and there is a link between the roller and shaft. Rotation of the shaft causes the unit to slide in its path. That camera is operated which is positioned adjacent the viewing panel.

PATENTED JAN 4 1972

INVENTOR
ARTHUR R. KENNINGTON and
ARTHUR E. SMITH

BY

William R. Liberman

ATTORNEY

INVENTOR
ARTHUR R. KENNINGTON and
ARTHUR E. SMITH
BY
William R. Lieberman
ATTORNEY

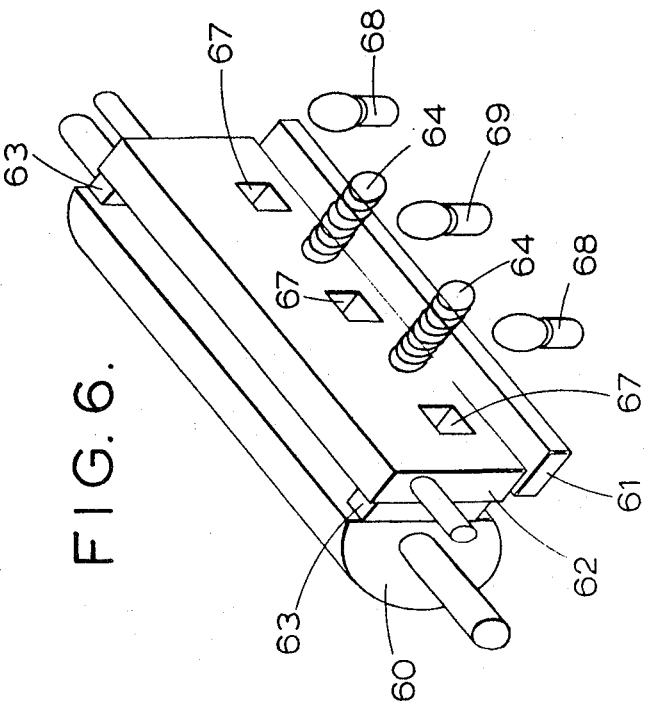
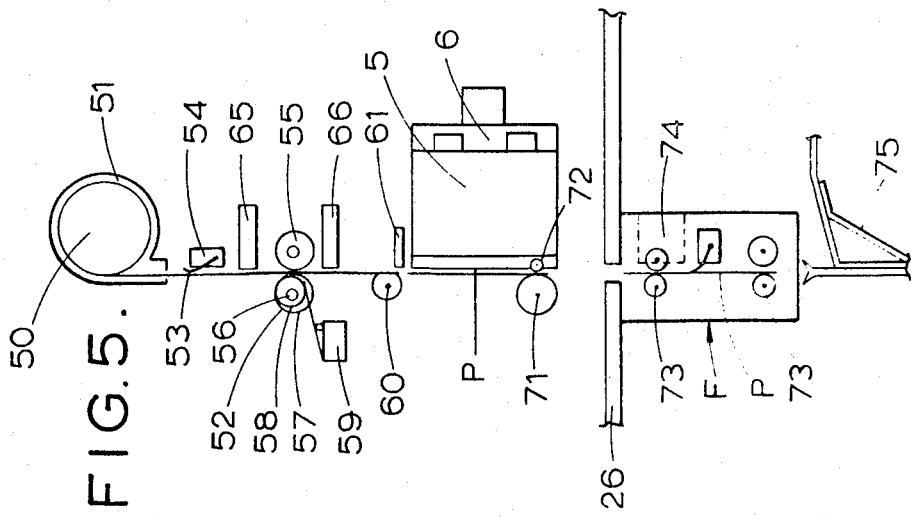

AUTOMATIC PHOTOGRAPHING APPARATUS

This invention relates to automatic photographic apparatus and particularly, but not exclusively, to an apparatus which functions on the insertion of a coin or counter to expose and develop a picture or a plurality of pictures on a strip of sensitized paper.

It is an object of the invention to provide such an apparatus which can be operated in accordance with one of three programs preselected by the customer to be photographed. In one of these programs a single photograph is taken on a paper of a desired size, in another program four substantially identical photographs are taken simultaneously from a single pose and printed on a single piece of paper and in the third program four photographs are taken from four different angles at timed intervals and printed on the same piece of paper. In the two programs in which there are four photographs such photographs are printed on a piece of paper of the same size as the piece on which a single photograph is printed.

DESCRIPTION OF THE DRAWINGS

FIG. 5 is a sectional diagram of the sensitized paper-handling part of the apparatus; and FIG. 6 is a perspective view of a paper cutter device forming part of the apparatus.

Figure 2:
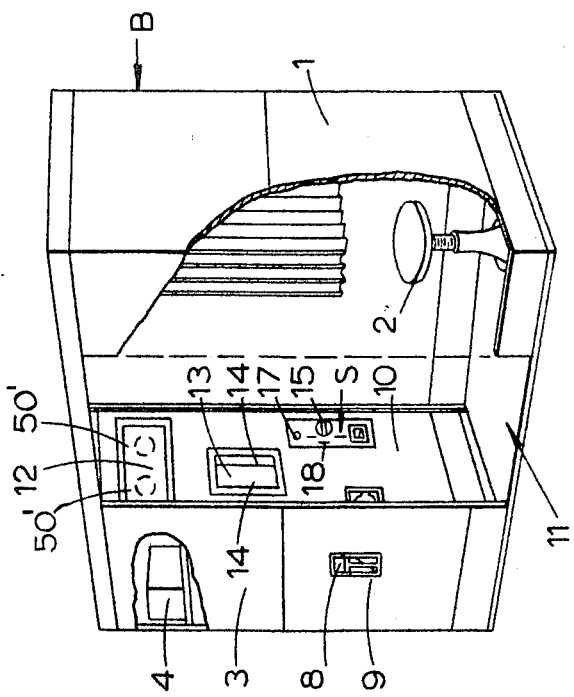
FIG. 2 is a vertical sectional view through the darkroom compartment of the apparatus.
Figure 1:
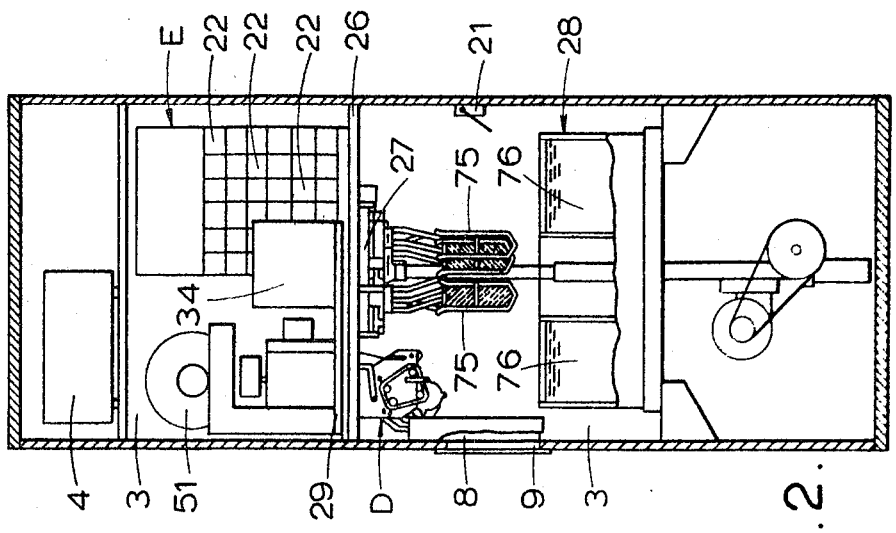
FIG. 1 is a perspective of one form of photographic apparatus, partially broken away, constructed according to and embodying the present invention.
Figure 4:
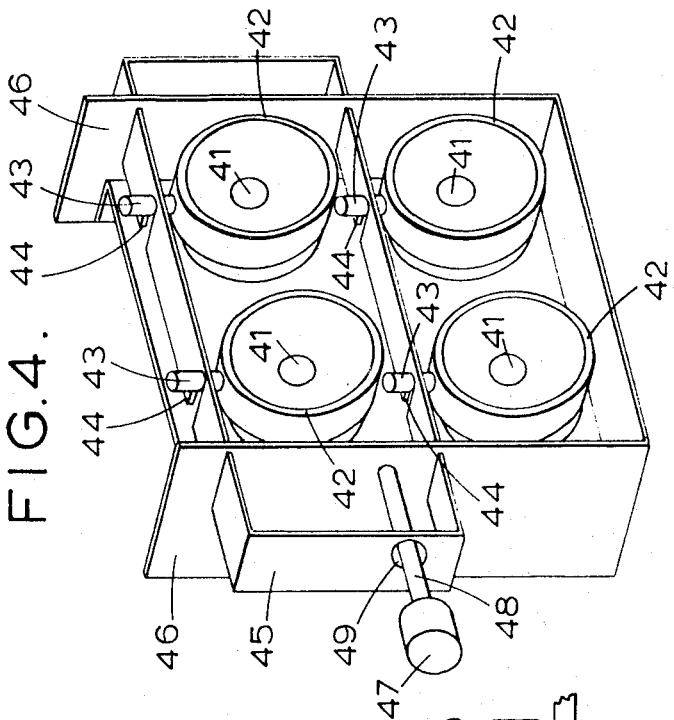
FIG. 4 is a perspective view of a portion of the camera unit.
Figure 3:
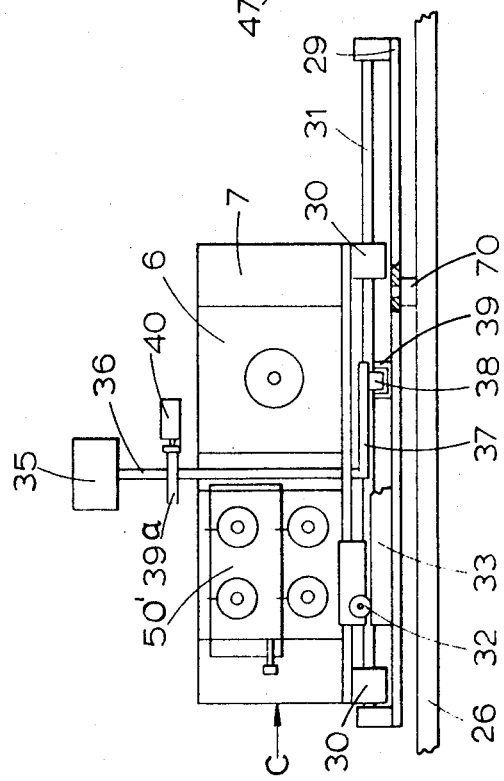
FIG. 3 is an elevation of a camera unit of the apparatus.

In a preferred embodiment of the invention such an apparatus comprises a booth B containing two compartments one of which (compartment 1) contains a seat 2 for the customer to be photographed and the other of which (compartment 3) is a dark compartment containing the photographic and ancillary apparatus and the chemical processing apparatus. The apparatus includes a strobe unit 4 which provides power for electronic flash tubes 50 to illuminate the customer while photographs are being taken. A camera unit C is mounted in the dark compartment 3 and includes two cameras 5, 6 with a common back 7 forming the focal plane. A feed down unit F withdraws exposed paper P from the camera and feeds same into a carrier 75 which holds the paper while it is being chemically processed. A delivery unit D collects the finished or processed print from the carrier and discharges it through a chute 8 into a collecting tray 9 communicating with an opening in a sidewall of the booth B. An electronic programming unit E controls the camera, exposure and processing operations.

The two compartments of the booth, which may be a portable structure of wood or metal, are separated by a lighttight door 10. The compartment 1 for the subject to be photographed has an opening 11 on one or both sides so that the subject can enter that compartment and has also a height-adjustable stool 2 on which the subject may be placed. Curtains or the like are also provided in this compartment so that a choice of backgrounds is available.

The lighttight door 10 between the two compartments 1, 3 has a glass panel 12 at above eye level through which can pass light from tubes 5 to illuminate the interior of compartment 1. A second glass panel 13, hereinafter called a "viewing panel," is provided in the door 10 at about eye level. The customer poses in front of this viewing panel and his photograph or photographs will be taken through this panel by the camera unit disposed within the dark compartment. Swinging doors or shutters 14 are provided on the dark compartment side of this viewing panel. The doors are closed. These shutters 14 open automatically at the commencement of a photographic operation so that the camera unit C can take photographs of the subject in the customer compartment. At a level lower than the viewing panel, a selector mechanism S is fixed to the door 10. This mechanism includes a rotatable knob or pointer 15 which is mounted on a shaft and can be turned to a desired angular position to select a desired photographic program. An indicator lamp 17 is provided in the door and is illuminated when the apparatus is in a condition for operation in response to the insertion of a coin into a coin-operated mechanism.

The coin-operated mechanism is freed to function on the insertion of suitable denomination regardless of the program selected by the customer. The coin-controlled mechanism is arranged on the inside of the door 10 and access to it is provided by a plurality of coin insertion slots 18 in the door. One such coin insertion slot 18 is provided for each of the three programs which can be selected. These slots 18 are covered by a rotatable obturator plate on the dark side of the door 10 and rotatable in response to rotation of the selector knob or pointer 15. This obturator plate has a slot which can register with any one of the coin insertion slots 18. When the operator has rotated the selector knob 15 to the position to select the program he desires, the slot in the obturator plate registers with the appropriate coin insertion slot 18 so that a coin can be inserted into the coin freed mechanism. Thus, the customer will insert a coin into the particular coin insertion slot appropriate to the program selected. The insertion of the coin through slot 18 triggers a switch 21 to set up the electronic program mechanism E in accordance with the program selected. This program mechanism E comprises a plurality of solid-state circuits. These circuits are arranged in modules 22. These modules, of conventional construction, provide a memory or a switching or a drive or a relay or a timing circuit. All modules of a like kind can be interchanged with others of the same kind.

The dark compartment 3 is divided into two sections, one above the other, by a shelf 26. The camera unit C is supported on the shelf 26 in the upper section which also contains the electronic program mechanism E. The lower section of the dark compartment contains the carrier 27 mechanism and the chemical processing apparatus 28. The camera unit comprises two cameras 5, 6 which are slidable as a unit on a baseplate 29. The camera unit can be shifted between two positions, in each of which one of the cameras is in a photographing or operating position. The camera unit includes two depending linear movement bearings 30 which can slide on a fixed guide rod 31 mounted on the baseplate 29, beneath the rear of the camera unit. The front of the camera unit is supported on a roller 32 running on a track 33. This roller 32 is adjustable for height so that the height or inclination of the camera unit can be adjusted if desired. The camera unit slides in a direction which is perpendicular to the lighttight door 10 and the viewing panel 13. A reflecting mirror 34 is therefore arranged on the baseplate 29 at a position such that the light path will be established between the customer sitting on the stool 2 in the customer compartment and the camera via the viewing panel 13 and the mirror 34. This arrangement serves to reverse the image which will fall on the sensitized paper in the camera so that positive photographs will be obtained.

The camera unit is moved backwards and forwards in accordance with instructions received from the programming mechanism E. The unit is moved by an electric motor 35 mounted on the unit and driving a vertical operating shaft 36. This shaft 36 rotates an operating arm 37 beneath the unit. One end of the operating arm 37 is fixed to the lower end of the vertical shaft 36 and the other end of the operating arm 37 is fixed to a guide roller 38 which is movable in a track 39 fixed to the baseplate 29 at right angles to the track of the camera unit. Thus, rotation of the shaft 36 and the operating arm 37 will cause the camera unit to move backwards and forwards on its track. A cam 39a on the vertical shaft 36 operates a microswitch 40 to switch off the electric motor 35 at every half revolution of the shaft 36. In this way, the camera unit can be reciprocated as desired by a nonreversible electric motor. The use of the rotatable shaft 36 and operating arm 37 driving a roller 38 for movement in a fixed track 39 reciprocates the camera unit at speeds which vary in accordance with a sine curve. In this way there will be no jarring of the camera unit.

One of the cameras in the camera unit is a single photograph on a sheet of sensitized paper when the camera is in the operative position. The other camera 5 is a four-lens camera, each of which can take a smaller photograph on approximately one quarter of the sheet of sensitized paper. The lenses of the four-lens camera have irises 41 which can be adjusted in unison. For this purpose, the iris ring 42 of each lens has a projection 43 which is located in a slot 44 in a rectangular adjusting frame 45. This adjusting frame 45 is mounted in guides 46 for sliding movement in response to rotation of a knurled head 47 of a screw-threaded rod 48 which is fixed against axial movement and is rotatable in a mating aperture 49 in the adjusting frame 45.

Each camera has an open back which is closed by a sheet of sensitized paper P when the camera is at its operative position. The sensitized paper is supplied from a reel 50 located in a magazine 51 mounted on the camera unit. The paper P is drawn downwards from this magazine by draw rollers 52. As the paper passes from the magazine 51 to the camera back it engages a sensitive finger 53 controlling a microswitch 54. If no paper is passed down, this switch 54 is operated to inhibit the use of the booth and no coin will be accepted by the coin operated mechanism.

The draw or driving rollers 52 engage one side of the strip of paper wound from the reel 50 and nondriving backing or pressure rollers 55 engage the other side of the paper. The driving rollers 52 are mounted on a common shaft 56 on which a metering roller 57 is also mounted. This metering roller 57 is freely rotatable on the shaft 56 and operates a cam 58 which actuates a microswitch 59 to operate a rotatable cutter blade 60 to cut the sheet of paper from the strip whenever a desired length of paper has been withdrawn from the reel 50. This blade 60 is located just above the camera back so that a sheet of paper separated from the supply strip is always located behind the camera. This metering roller 57 ensures that uniform lengths of paper are cut from the strip, whether or not there is any slip between the paper P and the driving rollers 52.

The rotatable cutter blade 60 cooperates with a fixed knife plate 61 on the opposite side of the paper. A shoe plate 62 is hinged on the rear side of the strip of paper. A shoe plate 62 is hinged on the rear side of the strip of paper above the fixed knife plate 61. The cutter 60 has two projections 63 which are spaced from each other by a distance greater than the width of the paper. As the cutter 60 operates to cut the paper, these projections engage the shoe plate 62 and push it away from the paper against the biasing of springs 64. When the cutting operation has been completed, these projections 63 move away from the shoe plate 62 which can therefore swing about its hinge towards the cutter under the action of the spring 64. In so doing, the plate 62 presses against the rear surface of the paper to ensure that the free or lower edge of the strip of paper moves clear of the fixed knife plate 61 so that the paper does not jam.

Means are provided for fogging the sensitized paper to provide a white border to photograph or photographs taken by the camera. Such fogging means produces a white border around the edge of the strip and when the four-lens camera is programmed to operate an additional cruciform area is fogged to provide borders for each of the four photographs taken by the four-lens camera. The horizontal border portions are produced by means of a fogging lamp 65 directing light against the sensitized surface of the paper at a position between the magazine and the top of the camera. It will be appreciated that the paper only advances in an intermittent manner and the fogging lamp 65 produces the fog area when the paper is stationary. The fogging lamp 65 is arranged to produce a border of double the required width. The cutter 60 then operates to cut the sheet of paper from the strip centrally of the double width fogged area so that the finished print will have a border of the required width. When the four-lens camera is operated, it is necessary to produce an intermediate fogged area to provide the horizontal component of the fogged area. For this purpose a second fogging lamp is provided between the reel and the camera and this second lamp 66 is operated by the programming device when the four-lens camera is to be used.

The vertical fogged areas are produced by directing light from fogging lamps through apertures 67 in the shoe plate 62 at the rear surface of each strip of paper. This arrangements directs light onto the sensitized surface of the paper to produce the desired fogging effect. The vertical fogged areas at the sides of the paper are produced by lamps 68 which operate every time a strip is advanced. The vertical component of the cruciform area is produced by another lamp 69 which is operated by the programming device whenever the four-lens camera is to be used.

The baseplate 29 is mounted for rotation on the shelf of the dark compartment about an eccentrically positioned pivot 70. When the lighttight door 10 is opened, the base plate can be swung round on this pivot 70 to provide access to the rear of the camera unit. This permits the magazine to be reloaded as desired, as well as providing access to the rear of the camera for repair or servicing purposes.

When the sheet of paper is positioned behind the operative position of the camera, its lower edge is engaged between drive 71 and pressure 72 rollers which are operated by the electric motor controlled by the programming device to move the paper downwards after a photograph has been taken, such downward movement of the sheet of paper feeds the paper between further rollers 73 of a feed down unit operated by an electric motor 74 and controlled by the program mechanism. These rollers 73 are so arranged as to produce a slight concavity in the paper before passing it into a carrier member 74 which operates to dip the exposed sheet of paper into each of a plurality of tanks 76 containing processing solutions. There are a plurality of such carriers supported on a spider rotatably mounted on a vertical transmission shaft. This shaft is moved to raise the carriers to receive exposed sheets of paper from the feed down unit and then to lower the carrier into the first of a circular row or bank of tanks containing the processing solution. When the carrier has dipped the print in the first solution it moves up and down by a slight distance to agitate the print in the solution. The spider then rises to lift the print clear of that tank and rotates to position the print above the next tank. The spider is then lowered to dip the print into the next solution in which it is again agitated, and this procedure continues until the print has been dipped into each of a desired number of processing tanks. This type of film or paper-processing apparatus is conventional and forms no part of this invention.

When the exposed sheet of paper has been processed in each of the tanks in the processing system it is delivered from the carriers into a discharge mechanism and discharged through a chute.

We claim:

1. A photographic apparatus comprising a booth having an operating compartment and a compartment in which a subject to be photographed can be positioned, a viewing panel between the two compartments, a camera unit arranged in the operating compartment and including two cameras, the said unit being slidable in a linear path to place either of the cameras in an operative position adjacent the viewing panel so that a photograph can be taken through the panel, an operating shaft extending from the unit; means for rotating the operating shaft; a track extending in a plane at right angles to the path of the unit; a guide roller arranged to run in the track; a link between the roller and the shaft whereby rotation of the shaft causes the unit to slide in its path; and means for operating the camera positioned adjacent the viewing panel.

2. An apparatus as claimed in claim 1 wherein the cameras are mounted on a base plate, a vertical operating shaft extends beneath the base plate, an electric motor is arranged to rotate the operating shaft, and a cam is rotatable by the shaft and is arranged to operate a switch for stopping the motor on completion of each half revolution of the shaft.

3. An apparatus as claimed in claim 2 wherein the camera unit has a fixed camera with a single lens and a second camera with a plurality of lens arranged to take a plurality of photographs and comprising means for feeding a strip of sensitized photographic material intermittently to the camera at the operative position, means for cutting an exposed portion of the material from the strip after the camera has been operated, means for directing light on to the sensitized material to produce a fogged border portion surrounding the portion cut off from the strip, and operable only when the second camera is in the operative position to direct light on to the sensitized material to produce a fogged cruciform area separating the separate photographs taken by the plurality of lens.

4. An apparatus as claimed in claim 3 comprising a first fogging lamp means arranged to project light on to the sensitized material while it is at rest to produce a horizontal fogged area before it is fogged fed to the camera at the operative position, a cutter blade for cutting the material horizontally and centrally of the horizontal fogged area, a shoe plate arranged to support the material during a cutting operation, second fogging lamp means arranged to project light through slots in the shoe to produce fogged areas at the vertical edges of the material, and thence fogging lamp means operable only when the second camera is in the operative position to produce a central vertical fogged area.

5. An apparatus as claimed in claim 4 comprising rollers engageable with opposite surfaces of the sensitized material to withdraw the material from the camera after it has been exposed, a metering roller rotatable by contact with a surface of the material, and means operable by the metering roller to actuate the guillotine.

6. An apparatus as claimed in claim 3 wherein the camera with a plurality of lens comprises a plurality of iris rings one of which is associated with each lens, an adjusting frame which is connected with all the iris rings and is slidable to rotate all the rings at the same time, a screw-threaded rotatable rod which is secured against axial movement and is engaged with the frame so that rotation of the rod displaces the frame, and means for rotating the rod.

7. An apparatus as claimed in claim 5 comprising a programming means arranged to operate lamps for illuminating the subject to be photographed, for positioning the camera unit and for operating the camera at the operative position, a coin freed mechanism for actuating the programming means, the said coin freed mechanism having a plurality of coin insertion slots for entry of a coin through each, which will select a program to be followed by the programming means, a rotatable obturator plate having a slot arranged to register with any one of the slots while the plate closes the remainder of the slots and a manually operable selector arranged to rotate the obturator plate.

8. An apparatus as claimed in claim 7 comprising an electronic programming means and plurality of switches one of which is associated with each slot so that insertion of a coin through that slot will operate the switch to select a program to be followed by the programming means.

* * * * *